Feb. 7, 1939.  F. R. STAMP  2,146,236
MOLDING TRAY
Filed Oct. 1, 1937

Inventor
Floyd R. Stamp
Albert E. Dieterich
and
By Theodore H. Rutley
Attorneys.

Patented Feb. 7, 1939

2,146,236

UNITED STATES PATENT OFFICE 2,146,236

MOLDING TRAY

Floyd R. Stamp, Wabash, Ind., assignor to Alice E. Stamp, Wabash, Ind.

Application October 1, 1937, Serial No. 166,869

7 Claims. (Cl. 62—108.5)

My invention has for its object to provide a tray for the making of "popsicles" in the chiller of an ordinary household refrigerator, such as the "Frigidaire".

Primarily it has for its object to provide a tray that will fit into the chiller unit in a horizontal position and which is of such construction and design that the sticks can be passed into the pockets of the tray through self-sealing holes in the end walls of the tray, and which is constructed of flexible material so that by simply bending the tray the frozen confections can be readily removed.

Other objects of the invention will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which:—

Figure 1:
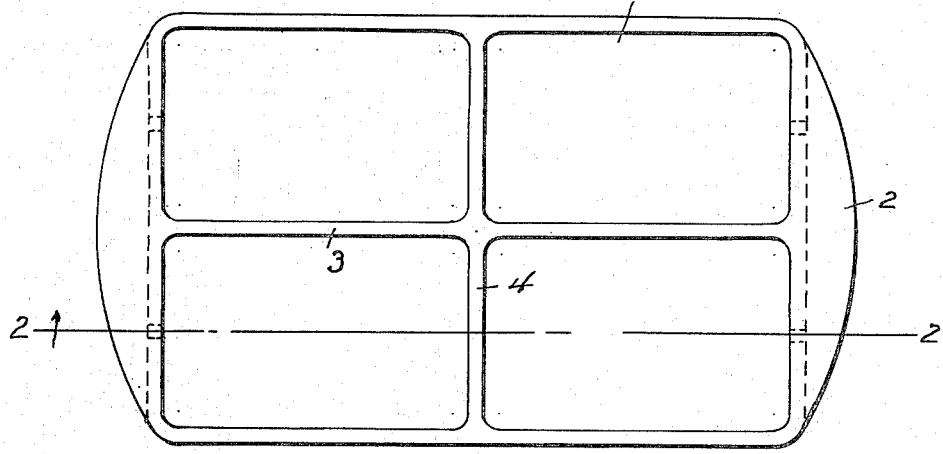
Figure 1 is a top plan view of the tray.
Figure 2:
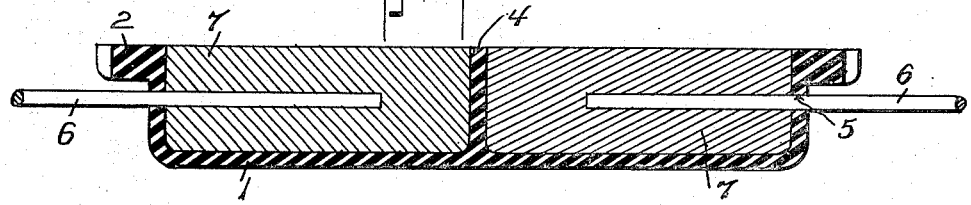
Figure 2 is a longitudinal section thereof, showing the sticks in place and the fluid contents of the pockets frozen.

In the drawing 1 represents a tray composed of rubber or other suitable elastic substance. It is divided into a set of pockets by longitudinal and transverse partitions 3 and 4, the end walls being provided with apertures 5 of less diameter than that of the sticks 6 of the "popsicles", the heads of which are formed by the frozen liquid 7 when the tray is filled and placed in the chiller of the refrigerator.

Suitable lips 2 are provided on the ends of the tray to serve as handles and also to stiffen the end walls of the tray.

Since the holes 5 are normally smaller than the diameter of the sticks 6, when the sticks are inserted the rubber of the hole-surrounding wall will hug the sticks tightly to prevent leakage of the liquid, even though the pocket is filled to a higher level than that of the holes 5.

Figure 3:
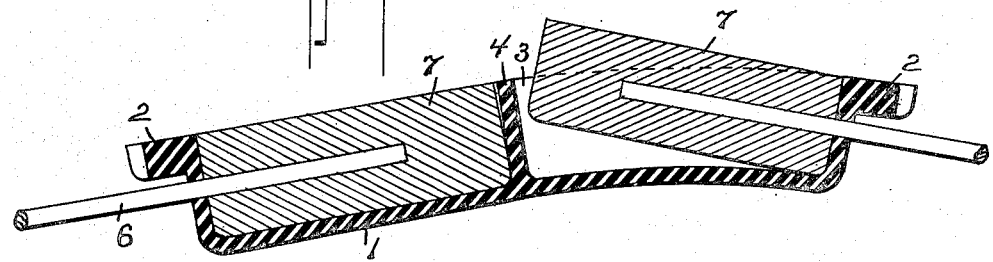
Figure 3 is a view similar to Figure 2, showing how the "popsicles" are removed.

To remove the frozen confections it is only necessary to bend or buckle upwardly the bottom of the tray (see Figure 3) and push the stick in the direction of the arrow until enough thereof is exposed in the pocket to grasp, when, by grasping the stick adjacent the head 7, it may be pulled through the hole 5.

All the inside walls of the tray are parallel, making a uniform article. No packing or gaskets at holes 5 are necessary to prevent escape of the liquid.

From the foregoing description, taken in connection with the accompanying drawing, it is thought that the construction, operation and advantages of the invention will be clear to anyone.

What I claim is:

1. A flexible elastic tray having cross and longitudinal partitions dividing it into a plurality of pockets, the end walls of the tray having apertures to receive "popsicle" sticks.

2. A rubber tray consisting of a shallow body having a bottom, side and end walls and a longitudinal and a transverse partition dividing the tray into a plurality of pockets, lips projecting from the end walls of the tray, the end walls of the tray being provided with stick-receiving apertures located between the top and bottom of the tray.

3. A rubber tray consisting of a shallow body having a bottom, side and end walls and a longitudinal and a transverse partition dividing the tray into a plurality of pockets, the end walls of the tray being provided with stick-receiving apertures located between the top and bottom of the tray.

4. A rubber tray consisting of a shallow body having a bottom, side and end walls and a longitudinal and a transverse partition dividing the tray into a plurality of pockets, the end walls of the tray being provided with stick-receiving apertures located between the top and bottom of the tray, said apertures being smaller than the cross section of the sticks they are to receive whereby they will seal the tray against leakage of liquid when the sticks are in place.

5. A rubber freezing tray for mechanical domestic refrigerators having chillers, said tray comprising a body of rectangular form having a bottom, side and end walls, and having partitions dividing the tray into a plurality of pockets, one wall of each pocket having below its top edge a hole to pass a "popsicle" stick and hold it in position by the elastic gripping action of the tray wall, as well as to seal the stick in the wall against liquid leakage.

6. A flexible elastic tray having cross and longitudinal partitions dividing it into a plurality of pockets, outer walls of the tray having openings to receive "popsicle" sticks and support the same above the bottom and below the top of the tray and projected into the pockets of the same.

7. As a new article, a flexible elastic tray comprising a bottom, an outer marginal wall and crossed partitions dividing the tray into several pockets each of which has at least one side formed by said marginal wall, said marginal wall having an opening for each pocket to receive a "popsicle" stick and support the same above the bottom and below the top of the tray and projected into the pocket, by virtue of all of which the tray may be filled with liquid to be frozen, the tray with the sticks in place being of a size to be located within the ordinary chiller of a household refrigerator.

FLOYD R. STAMP.